US007447641B2

(12) United States Patent
Dong et al.

(10) Patent No.: US 7,447,641 B2
(45) Date of Patent: Nov. 4, 2008

(54) USER INTERFACE AND ALGORITHM TO HANDLE "UNKNOWN" DATA IN CARD-SORTING EXERCISE AND CLUSTER ANALYSIS

(75) Inventors: Jianming Dong, Austin, TX (US); Paul David Waldo, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1427 days.

(21) Appl. No.: 10/185,709

(22) Filed: Jun. 27, 2002

(65) Prior Publication Data

US 2004/0010547 A1 Jan. 15, 2004

(51) Int. Cl.
*G06Q 10/00* (2006.01)
(52) U.S. Cl. .............................. 705/1; 705/7
(58) Field of Classification Search ...... 705/1, 705/7
See application file for complete search history.

(56) References Cited

U.S. PATENT DOCUMENTS

| 5,041,972 A | * | 8/1991 | Frost ........................... 705/10 |
| 5,347,595 A | | 9/1994 | Bokser ......................... 382/36 |
| 5,657,397 A | | 8/1997 | Bokser ......................... 382/225 |
| 5,666,442 A | | 9/1997 | Wheeler ....................... 382/209 |

FOREIGN PATENT DOCUMENTS

| JP | 11096132 A | 4/1999 |
| JP | 2001134577 A | 5/2001 |
| JP | 11096010 A | 7/2001 |
| JP | 2001184367 A | 7/2001 |

OTHER PUBLICATIONS

Geoff Sauer, EZSort, May 14, 2001, EServer TC Library.*
Mostafa, J. et al. "A Multilevel Approach to Intelligent Information Filtering: Model, System and Evaluation", ACM Digital Library, 1997, pp. 368-399.
Harandi, MT et al., "Rule Base Management Using Meta Knowledge", ACM Digital Library, 1986, pp. 261-267.

* cited by examiner

*Primary Examiner*—Naresh Vig
(74) *Attorney, Agent, or Firm*—Duke W. Yee; Justin M. Dillon; Gerald H. Glanzman

(57) ABSTRACT

Card-sorting exercises are used to understand how users would intuitively group or sort information topics, in order to better design an instrument that provides these topics, such as a website. When a user is not familiar with some of the topics, they are allowed to leave these items unsorted, in order that wild guesses do not skew the results. The algorithm verifies that the unsorted items are unfamiliar, then tracks instances of unsorted items so that these responses are mathematically removed from the calculations.

31 Claims, 9 Drawing Sheets

FIG. 6A

|   | A | B | C | D | E | F | G | H | I | J |
|---|---|---|---|---|---|---|---|---|---|---|
| B | 0 | | | | | | | | | |
| C | 0 | 0 | | | | | | | | |
| D | 0 | 1 | 0 | | | | | | | |
| E | 0 | 0 | 0 | 0 | | | | | | |
| F | 0 | 0 | 0 | 0 | 2 | | | | | |
| G | 0 | 0 | 0 | 0 | 0 | 0 | | | | |
| H | 0 | 0 | 2 | 0 | 0 | 0 | 0 | | | |
| I | 0 | 2 | 0 | 1 | 0 | 0 | 0 | 0 | | |
| J | 0 | 0 | 2 | 0 | 0 | 0 | 0 | 2 | 0 | |
| K | 0 | 0 | 0 | 0 | 0 | 0 | 0 | 0 | 0 | 0 |

FIG. 6B

|   | A | B | C | D | E | F | G | H | I | J |
|---|---|---|---|---|---|---|---|---|---|---|
| B | 17 | | | | | | | | | |
| C | 17 | 24 | | | | | | | | |
| D | 17 | 33 | 24 | | | | | | | |
| E | 22 | 16 | 16 | 16 | | | | | | |
| F | 23 | 17 | 17 | 17 | 27 | | | | | |
| G | 16 | 30 | 22 | 36 | 15 | 15 | | | | |
| H | 16 | 23 | 28 | 23 | 16 | 16 | 22 | | | |
| I | 17 | 37 | 24 | 33 | 16 | 17 | 30 | 23 | | |
| J | 17 | 24 | 29 | 24 | 16 | 17 | 22 | 33 | 24 | |
| K | 22 | 16 | 16 | 16 | 30 | 27 | 15 | 16 | 16 | 16 |

FIG. 7A

|   | A | B | C | D | E | F | G | H | I | J |
|---|---|---|---|---|---|---|---|---|---|---|
| B | 0 | | | | | | | | | |
| C | 0 | 0 | | | | | | | | |
| D | 0 | 0 | 0 | | | | | | | |
| E | 0 | 0 | 0 | 0 | | | | | | |
| F | 0 | 0 | 0 | 0 | 0 | | | | | |
| G | 1 | 1 | 1 | 1 | 1 | 1 | | | | |
| H | 0 | 0 | 0 | 0 | 0 | 0 | 1 | | | |
| I | 0 | 0 | 0 | 0 | 0 | 0 | 1 | 0 | | |
| J | 0 | 0 | 0 | 0 | 0 | 0 | 1 | 0 | 0 | |
| K | 1 | 1 | 1 | 1 | 1 | 1 | 1 | 1 | 1 | 1 |

FIG. 7B

|   | A | B | C | D | E | F | G | H | I | J |
|---|---|---|---|---|---|---|---|---|---|---|
| B | 0 |   |   |   |   |   |   |   |   |   |
| C | 0 | 0 |   |   |   |   |   |   |   |   |
| D | 0 | 0 | 0 |   |   |   |   |   |   |   |
| E | 1 | 1 | 1 | 1 |   |   |   |   |   |   |
| F | 0 | 0 | 0 | 0 | 1 |   |   |   |   |   |
| G | 2 | 2 | 2 | 2 | 2 | 2 |   |   |   |   |
| H | 1 | 1 | 1 | 1 | 1 | 1 | 2 |   |   |   |
| I | 0 | 0 | 0 | 0 | 1 | 0 | 2 | 0 |   |   |
| J | 0 | 0 | 0 | 0 | 1 | 0 | 2 | 0 | 0 |   |
| K | 1 | 1 | 1 | 1 | 1 | 1 | 2 | 1 | 0 | 1 |

FIG. 8

|   | A | B | C | D | E | F | G | H | I | J |
|---|---|---|---|---|---|---|---|---|---|---|
| B | .43 |   |   |   |   |   |   |   |   |   |
| C | .43 | .60 |   |   |   |   |   |   |   |   |
| D | .43 | .83 | .60 |   |   |   |   |   |   |   |
| E | .58 | .42 | .42 | .42 |   |   |   |   |   |   |
| F | .58 | .43 | .43 | .43 | .71 |   |   |   |   |   |
| G | .44 | .83 | .61 | 1.0 | .42 | .42 |   |   |   |   |
| H | .42 | .61 | .74 | .61 | .42 | .42 | .61 |   |   |   |
| I | .42 | .93 | .60 | .83 | .42 | .43 | .83 | .61 |   |   |
| J | .42 | .60 | .73 | .60 | .42 | .43 | .61 | .87 | .60 |   |
| K | .58 | .42 | .42 | .42 | .79 | .71 | .42 | .42 | .42 | .42 |

FIG. 9

|   | A | B | C | D | E | F | G | H | I | J |
|---|---|---|---|---|---|---|---|---|---|---|
| B | .58 |   |   |   |   |   |   |   |   |   |
| C | .58 | .40 |   |   |   |   |   |   |   |   |
| D | .58 | .18 | .40 |   |   |   |   |   |   |   |
| E | .42 | .58 | .58 | .58 |   |   |   |   |   |   |
| F | .43 | .58 | .58 | .58 | .29 |   |   |   |   |   |
| G | .56 | .17 | .39 | 0 | .58 | .58 |   |   |   |   |
| H | .58 | .39 | .26 | .39 | .58 | .58 | .39 |   |   |   |
| I | .58 | .08 | .40 | .18 | .58 | .57 | .17 | .39 |   |   |
| J | .58 | .40 | .28 | .40 | .58 | .57 | .39 | .13 | .40 |   |
| K | .42 | .58 | .58 | .58 | .21 | .29 | .58 | .58 | .58 | .58 |

USER INTERFACE AND ALGORITHM TO HANDLE "UNKNOWN" DATA IN CARD-SORTING EXERCISE AND CLUSTER ANALYSIS

BACKGROUND OF THE INVENTION

1. Technical Field

The present invention relates generally to a method of gathering and correlating user input regarding relationships between topics, this information being useful in designing web sites, program interfaces, and many other information design applications. Specifically, the present invention provides a method and algorithm for handling a lack of user input in portions of the data gathering process where the user is unfamiliar with some of the items presented.

2. Description of Related Art

Card sorting is a technique used by the builders of web sites to organize the information on the site and to decide how to label the categories for ease of use. The technique works by gathering data from a number of users regarding their perception of relationships between topics. The strength of the perceived relationships can then drive the design of the site.

In a manual version of card sorting, a user is given a set of index cards containing likely topics for the site, one topic per card. The user then sorts the cards into groups according to his perception of which topics belong together. Note that in this exercise, there is no right or wrong way to sort items. This is a subjective exercise that seeks to discover perceptions. Therefore, different users will have a tendency to group items differently, especially as the ideas they represent become the more complex.

The input from a number of users can then be correlated in a matrix according to how closely users group each set of two cards together, a methodology known as cluster analysis. Manual correlation and analysis, however, can be tedious.

EZSort is a software package created by IBM, Inc., which handles the card sorting process and analysis. EZSort has two parts—USort and EZCalc. USort handles the card sorting exercise for all participants; EZCalc performs cluster analyses on the accumulated data and generates tree diagrams that represent the hierarchical relationships.

FIG. 1A shows a computer screen containing a typical card-sorting exercise handled by USort. In this figure, the "cards" to be sorted are presented on the left side of the screen (the source); the right side of the screen (the target) is where a user sorts the cards into groups separated by horizontal lines, using drag and drop operations. Notice that the cards to be sorted include a wide variety of topics including hardware, software, languages, operating systems, interfaces between users, interfaces between computers, etc. A user's background and experience will tend to affect the way that he would perceive items as belonging together.

When the user is satisfied with the groupings, clicking on the right arrow (110) causes the program to move to the next step, seen in FIG. 1B. On this second screen, the user is allowed to designate further, higher-level groupings, if these are deemed desirable. The previously formed groups are presented. The groups can be rearranged, and larger groupings formed by making the lines between high-level groups into double lines. In a third step, which is not shown, the user is allowed to name the categories into which he has grouped items. Once the exercise is complete, the users information is saved to a file for later processing.

When all card-sorting exercises have been done, the data goes to EZCalc for analysis. A raw score matrix is created for each participant, according to the following. If two items are not grouped together by the participant, a value of 0 is assigned. If the two items are grouped together in a high-level grouping, but not in the low-level grouping, a value of 1 is assigned. If the two items are grouped together in both the high-level and low-level groupings, a value of 2 is assigned. Thus, each possible pairing of items receives a score of 0, 1, or 2. Next, the raw scores for each pair of items are summed together for all of the participants, forming a total raw score matrix. The values in this matrix are normalized into a similarity matrix by dividing each score by 2·n, where n is the number of participants. Each element in the similarity matrix now has a score of 0 to 1. Items in the similarity matrix are converted into a distance matrix, using the formula $$D(x,y)=1-S(x,y)$$

where $D(x,y)$ is an element in the distance matrix for card pair x and y, and $S(x,y)$ is a corresponding element in the similarity matrix.

Finally, cluster analysis converts the distance matrix into tree diagrams for analysis.

While this type of program has been very helpful in speeding up the analysis of card-sorting applications, a problem exists when participants are not familiar with the content of every card. This can happen, for example, when a company provides a variety of specialized, technical products, such as those shown in FIGS. 1A and 1B. A person who regularly utilizes some of the products may have little or no knowledge in other products. This type of program has previously required each participant to group every card that was presented to them, regardless of their knowledge of the content of the card. By forcing the sorting of "unknown" cards, the relationships involving them are skewed. It would be desirable to have a program that did not force such a choice, but that could deal with this lack of input in some areas.

SUMMARY OF THE INVENTION

The present invention provides a method and computer algorithm for handling cards that are not sorted by one or more participants and for weighting relational distances accordingly. When a participant does not sort one or more cards, a screen prompt checks to be sure that this is intentional. Then, a record is kept of that card, as well as of the groups the participant formed. When the matrix of responses is created for this participant, any pair that contains an unselected card is assigned a score of 0. This will be added to the other raw scores to form the summed raw score. At the same time, an unknown matrix is generated for the participant. This matrix is initially all zeros. Whenever a participant does not sort one or both of the cards in a pair, the value for that pair is set to one. A total unknown matrix contains a summary of all unknowns for all participants. When the summed raw scores are normalized, rather than dividing by 2·n, each individual element is divided by $2·(n-U(x,y))$, where n is the total number of participants in the card-sorting activity and $U(x,y)$ is the number of participants who did not group at least one of the items in the pair containing x and y. The rest of the calculations remain the same. A final change is made in the display portion of the program. When the tree structure is displayed, any item which some participants did not sort will have a fraction shown next to it, giving the number of participants out of the total who sorted that item.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 6A and 6B are exemplary raw score matrices for an individual participant and for all participants respectively;

FIGS. 7A and 7B are exemplary unknown matrices for an individual participant and for all participants respectively;

FIG. 8 is an exemplary similarity matrix.

FIG. 9 is an exemplary distance matrix;

DETAILED DESCRIPTION OF THE PREFERRED EMBODIMENT

Figure 1A:
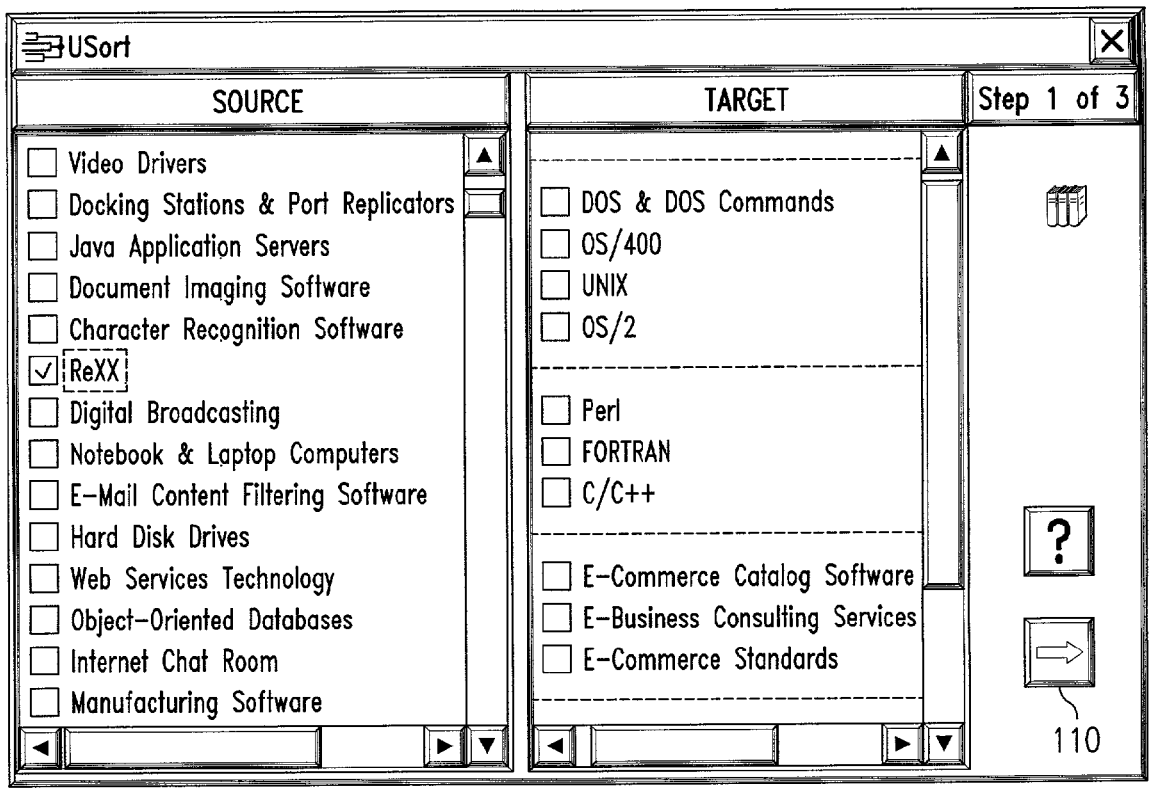
FIGS. 1A and 1B show exemplary screens during a the execution of first and second steps of EZSort.
Figure 1B:
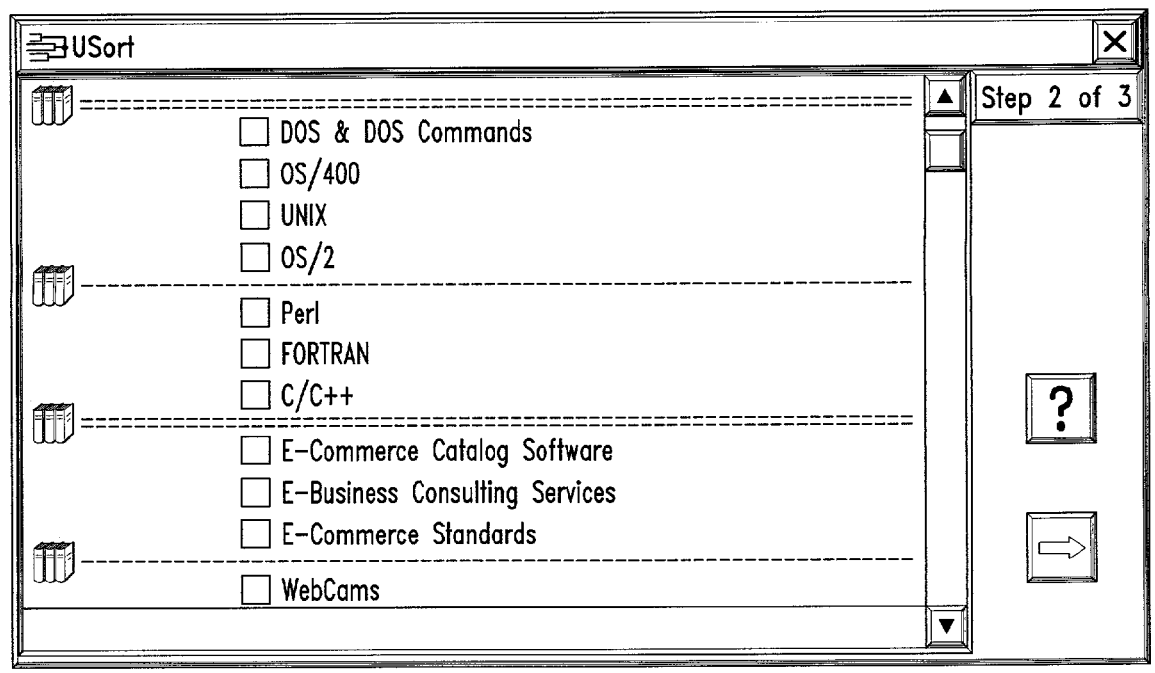
Figure 2:
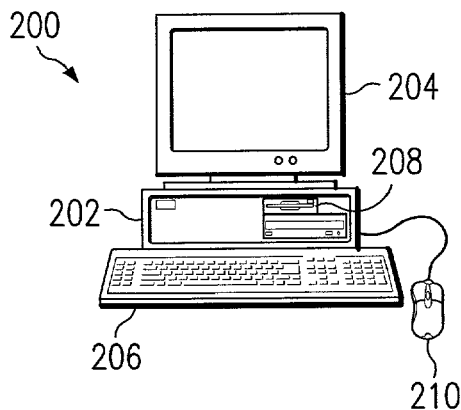
FIG. 2 shows a personal computer.

With reference now to the figures and in particular with reference to FIG. 2, a pictorial representation of a data processing system in which the present invention may be implemented is depicted in accordance with a preferred embodiment of the present invention. A computer 200 is depicted which includes system unit 202, video display terminal 204, keyboard 206, storage devices 208, which may include floppy drives and other types of permanent and removable storage media, and mouse 210. Additional input devices may be included with personal computer 200, such as, for example, a joystick, touchpad, touch screen, trackball, microphone, and the like. Computer 200 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 200 also preferably includes a graphical user interface (GUI) that may be implemented by means of systems software residing in computer readable media in operation within computer 200.

Figure 3:
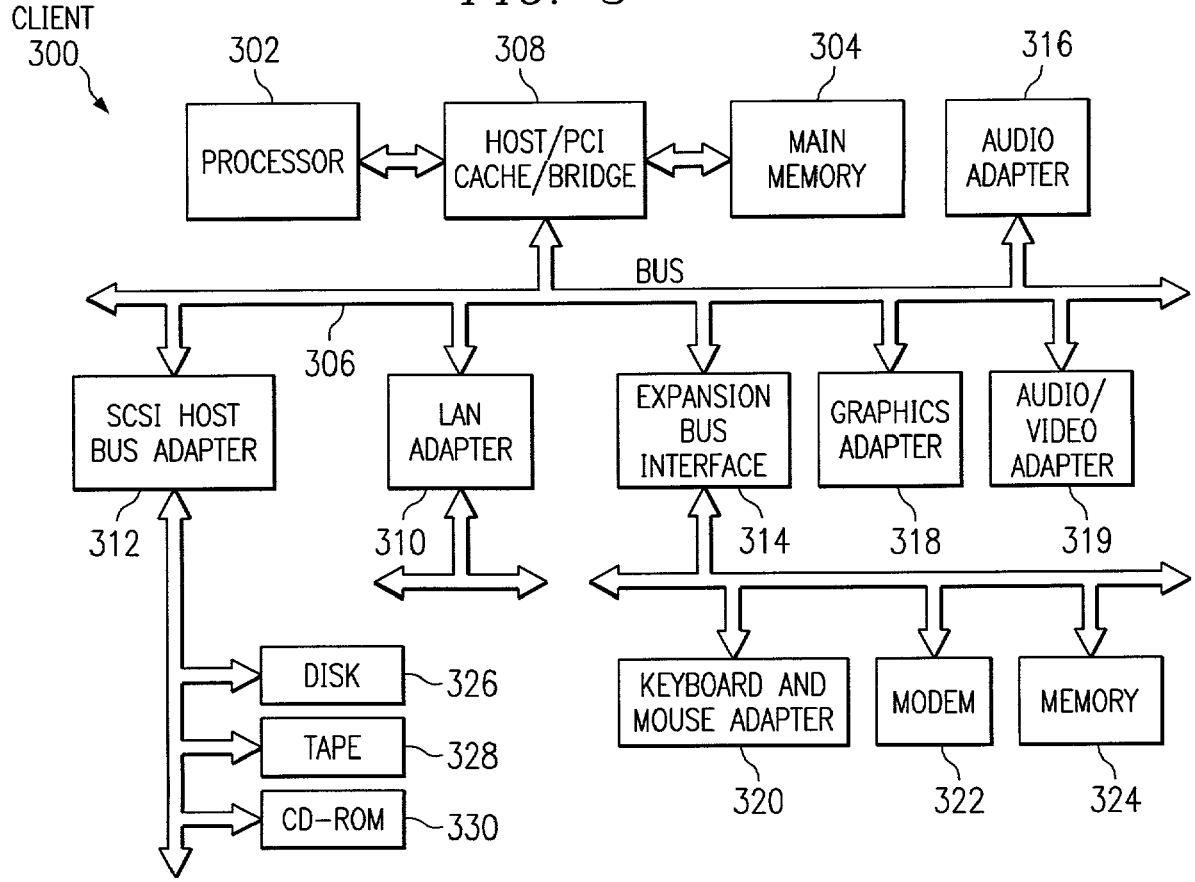
FIG. 3 shows a block diagram of a computer system in which the disclosed invention can be used.

With reference now to FIG. 3, a block diagram of a data processing system is shown in which the present invention may be implemented. Data processing system 300 is an example of a computer, such as computer 200 in FIG. 2, in which code or instructions implementing the processes of the present invention may be located. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, small computer system interface SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as Windows XP, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330. In that case, the computer, to be properly called a client computer, includes some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a personal digital assistant (PDA), which is configured with ROM and/or flash ROM to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The processes of the present invention are performed by processor 302 using computer implemented instructions, which may be located in a memory such as, for example, main memory 304, memory 324, or in one or more peripheral devices 326-330.

Figure 4A:
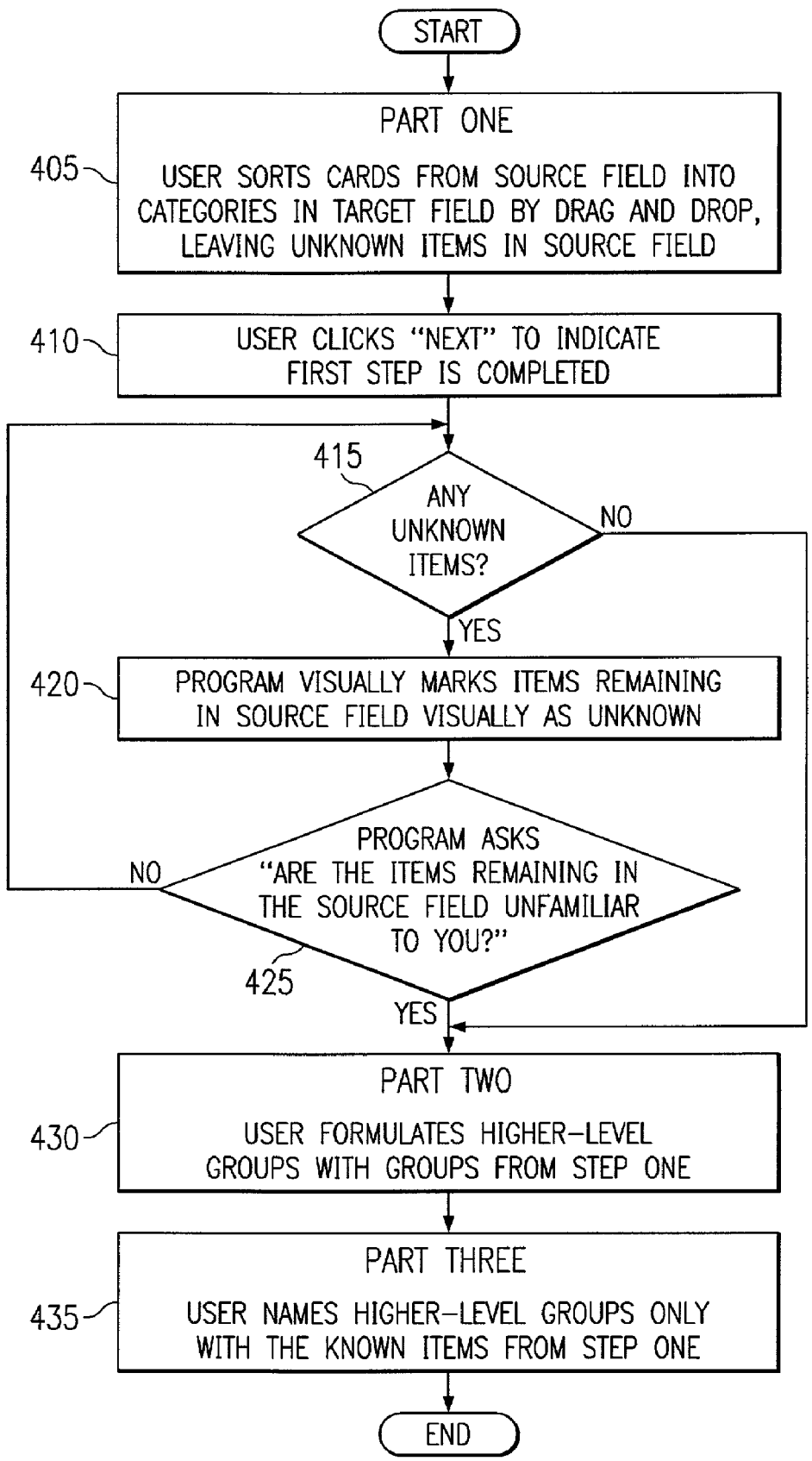
FIGS. 4A and 4B is a flowchart representation of a process of card sorting according to a preferred embodiment of the present invention.

We will now walk through an embodiment of the innovative process in order to explain it more fully, starting with reference to FIGS. 4A and B, which show a flowchart of the process and to FIGS. 5-9, which show choices faced by the user and the matrices created by the program as it works. The process begins in the same manner as its predecessor—with the presentation of a screen that offers items for the participant to sort, shown in FIG. 5A. For the sake of simplicity, we will discuss only eleven cards in this example, although these may be part of a larger study that includes more cards. The eleven cards of interest are shown on the source side of the screen and have arbitrarily been labeled A-K for reference. The first user performs his sorting (step 405), as shown in FIG. 5B. This participant has left items G and K unsorted, as he is unfamiliar with these items. He clicks the arrow to indicate that he is through sorting (step 410). The program checks to see if any items remain in the Source field (step 415); if not, it skips ahead to the next part of the algorithm (step 430); otherwise, the program visually marks (step 420) the remaining items in the Source field and presents (step 425) the screen seen in FIG. 5C. This screen notes that items were left in the source side of the screen and seeks to discover if this was intentional. If it was inadvertent, the user clicks on the "no" button and is given another chance to finish sorting (step 415); if the user left items because he was not familiar with them, the user clicks on the "yes" button and the program proceeds. At the same time, the program saves a copy of items that were left on the source side as "unknown". In the next part of the input, the previous groups are presented to allow further, higher level groupings, if desired. In FIG. 5D, the participant has made further entries. Note that this user has further grouped only two groups (step 430), the group containing B and I and the group containing only D. These two groups are separated only by a single line, showing that they are grouped together at a higher level, but not at a lower level. All other groups are separated by double lines. The input phase concludes with part 3, not specifically shown, in which the user names the higher level groups that he has created (step 435). Data will be gathered from a number of participants, each following the process outlined above. Once the data is collected, it is analyzed.

Figure 4B:
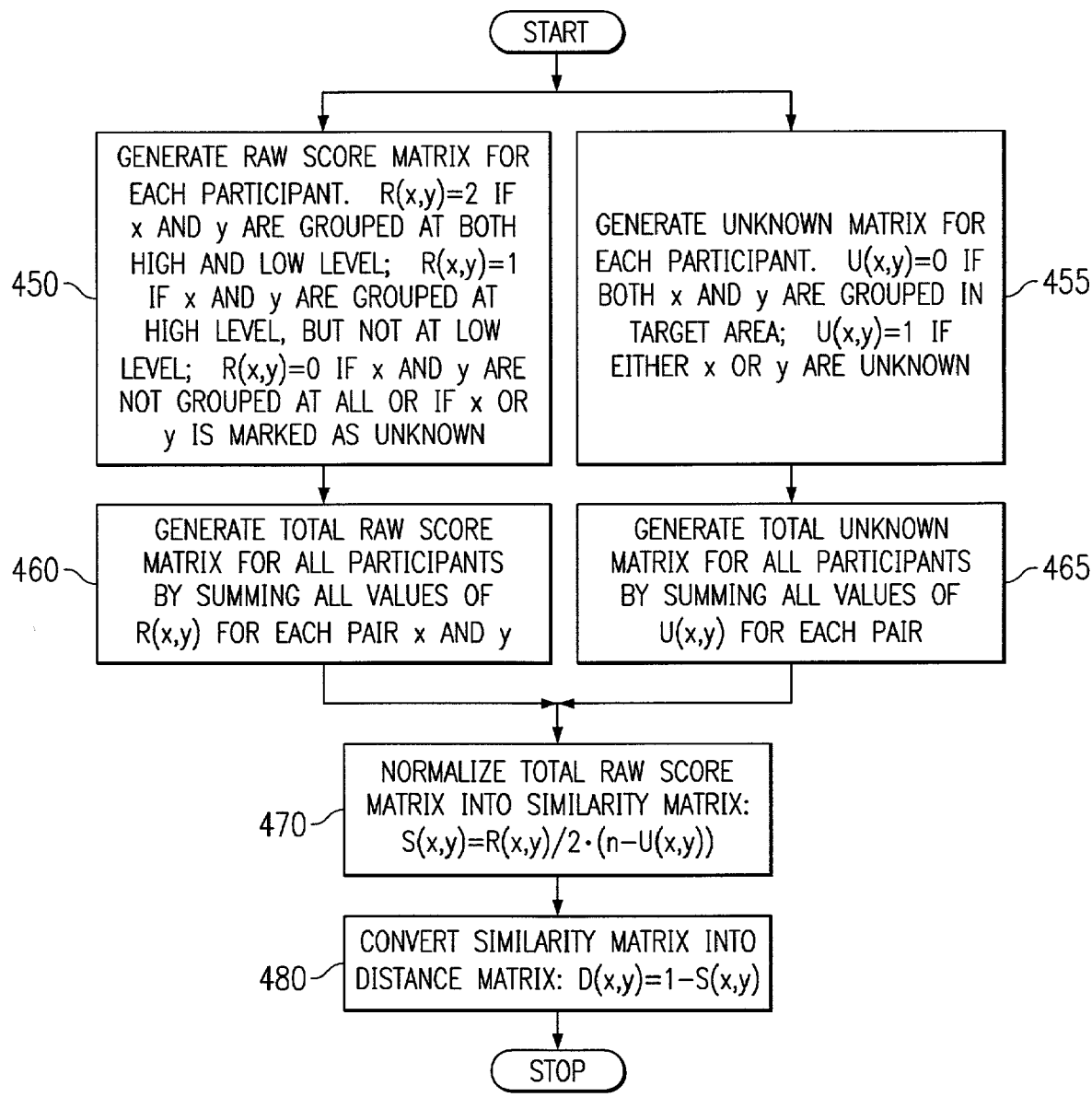
Figure 5A:
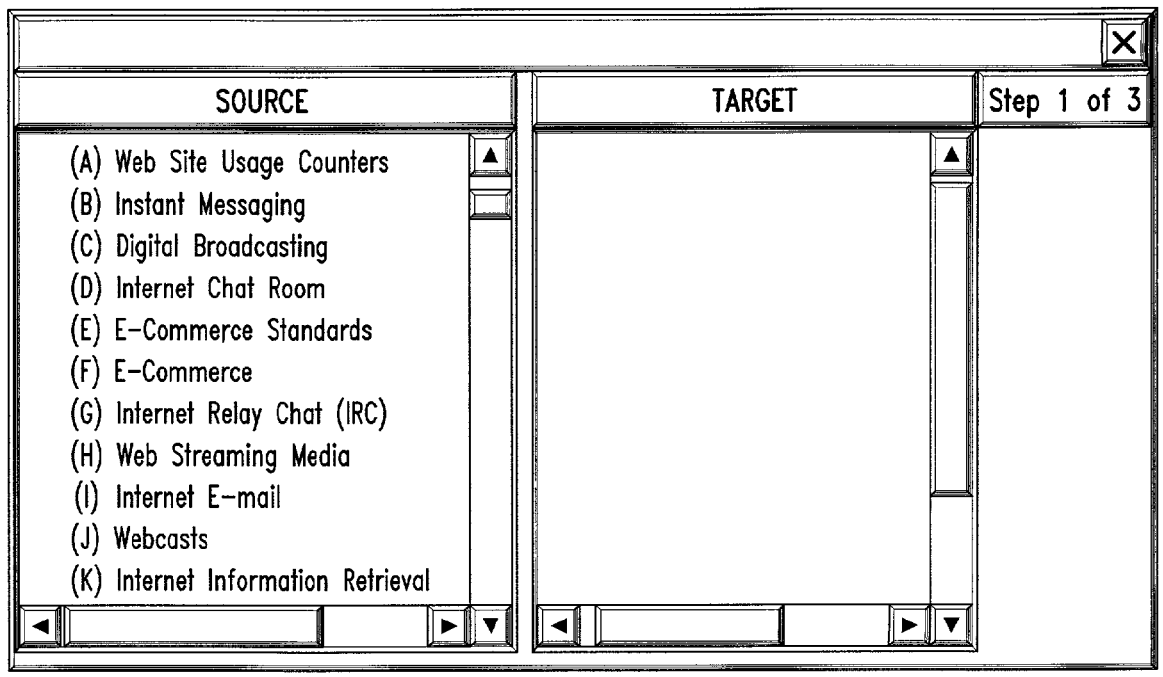
FIGS. 5A-D are exemplary screens for a first user as he works through the sorting process.
Figure 5B:
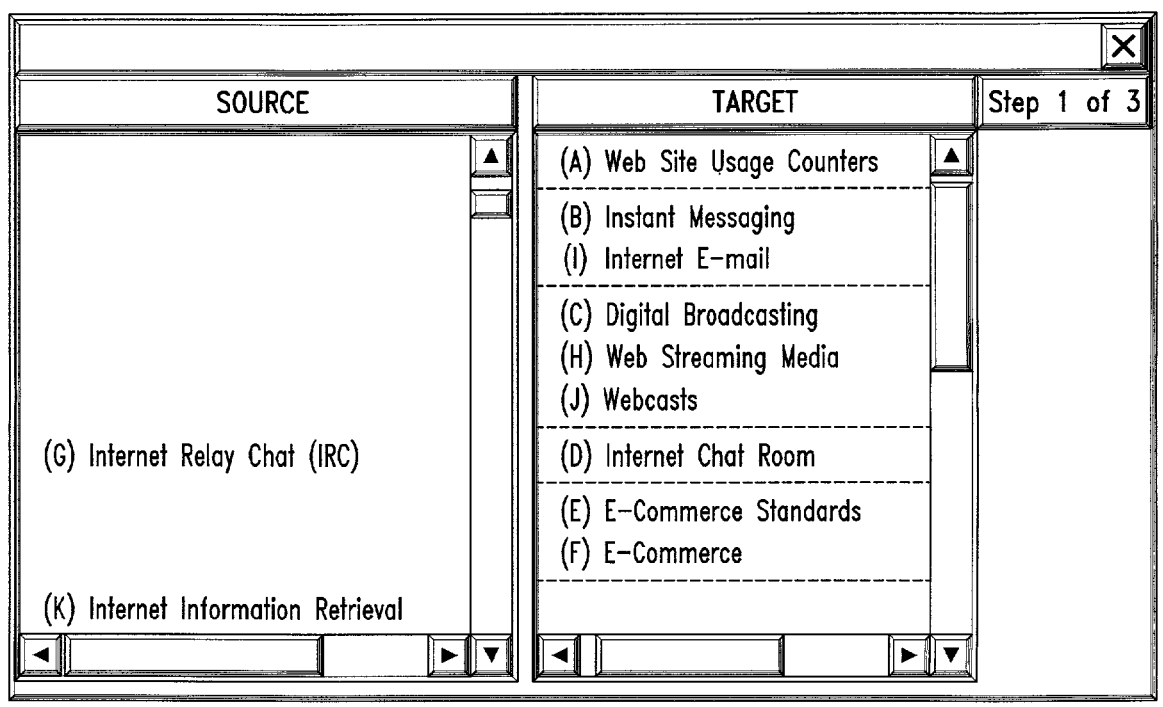
Figure 5C:
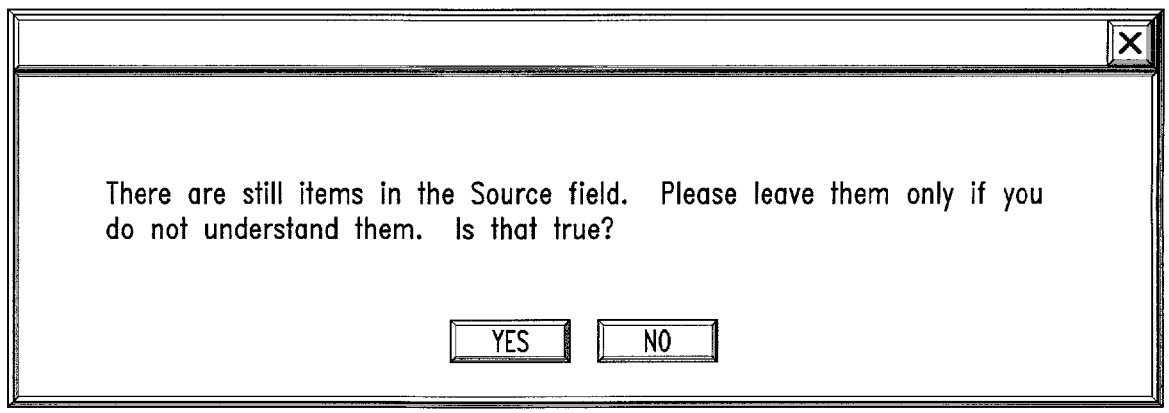
Figure 5D:
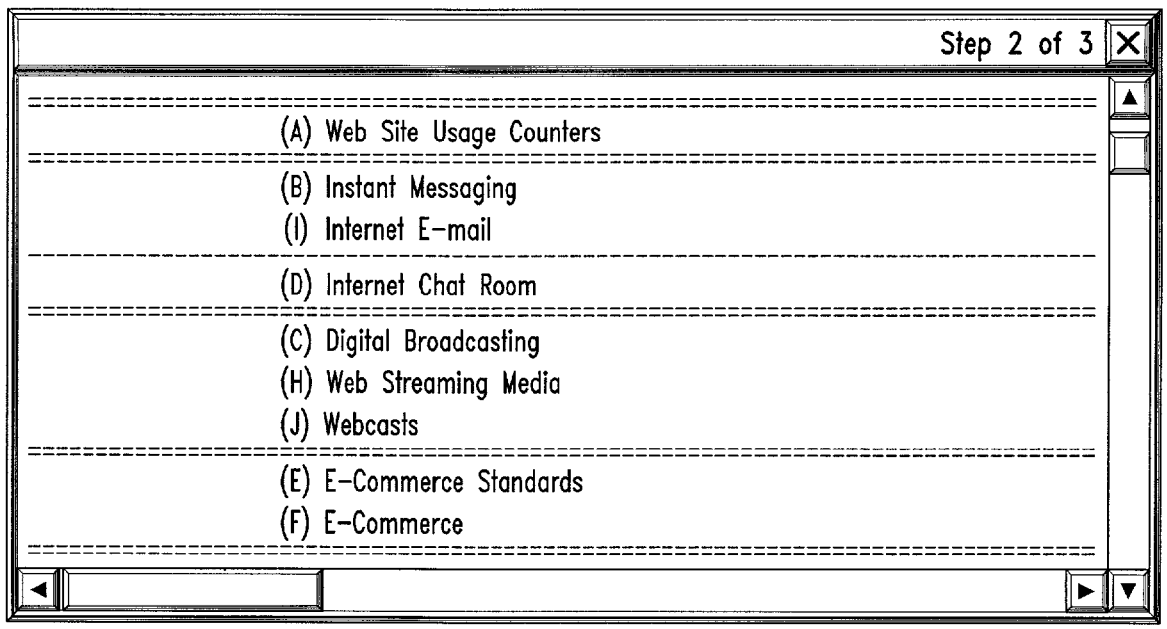

The flow for analysis of the data is shown in FIG. 4B. First, a raw score matrix is formed for each participant (step 450). The raw score matrix for the first user is shown in FIG. 6A. Comparing this matrix to the groupings seen in FIGS. 5B and 5C, we can note that items B and I were grouped together at both levels and the matrix M(B,I)=2. Likewise, the matrix entries for M(C,H), M(C,J), M(H,J), and M(E,F) are equal to 2. Items in the group containing B and I were grouped with items in the group containing D at the higher levels, although not at the lower levels. Therefore M(B,D) and M(I,D) have values of 1. All other values are zero. Note particularly that there are zeros for any pair which contains items G or K, which were not sorted at all.

Additionally, an unknown matrix is created (step 455) for the first user, shown in FIG. 7A. In this unknown matrix, there is a value of 1 for those pairs in which one or both of the items were not sorted; all other values are 0. Thus, any pair containing items G or K is 1. Notably, although there were only two items not sorted, there are nineteen pairs that are affected. This provides some indication of how much a mistaken grouping, done because the user wasn't familiar with an item, can affect an analysis.

In the next step, a total raw score is created for all participants by adding all the values for corresponding matrix positions for all participants (step 460). For our hypothetical example, twenty participants completed the sorting exercise, with the total raw score shown in FIG. 6B. Of these participants, including the first participant, two persons did not sort item G, one did not sort item E, one did not sort item H and one did not sort item K. A total unknown matrix is formed by adding all the corresponding values from the unknown matrices for all participants (step 465). FIG. 7B is the total unknown matrix. This matrix shows how many persons did not address a particular pair.

Next, each of the raw scores is normalized to a value representative of the similarity of the items as seen by the participants. This similarity matrix, shown in FIG. 8, is formed by dividing each total raw score by the highest score possible for that pair (step 470). Since the number of persons NOT answering each question is shown in the total unknown matrix, the highest score possible for pair x,y is 2·(20−N(x,y)), where N(x,y) is the corresponding entry in the total unknown matrix and 20 is the number of participants. To generalize, $$S(x,y)=R(x,y)/(2\cdot(n-N(x,y)))$$

where S(x,y) is an entry in the similarity matrix for pair x,y;

R(x,y) is a corresponding entry in the total raw score matrix, and n is the number of participants in the study.

Once the similarity matrix has been created, it is transformed into the distance matrix (step 480) by subtracting each similarity entry from 1 to create the corresponding distance entry. That is $$D(x,y)=1-S(x,y)$$

Where S(x,y) is an entry in the similarity matrix for pair x and y and D(x,y) is the corresponding entry in the distance matrix. The distance matrix is shown in FIG. 9.

Figure 10:
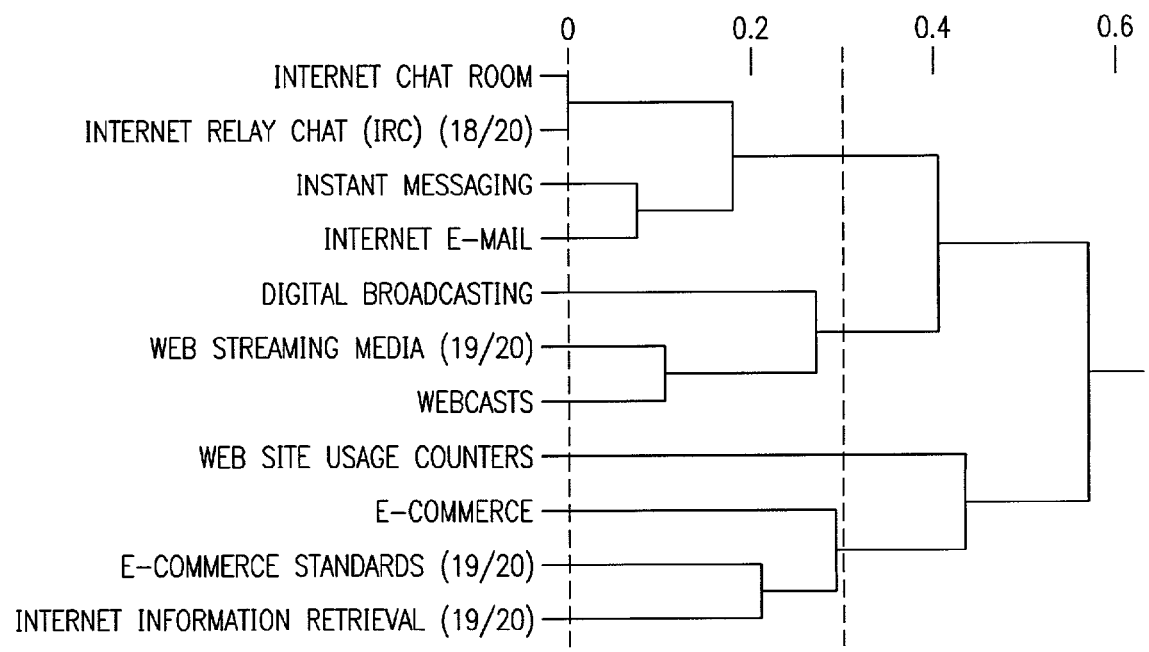
FIG. 10 is an exemplary tree structure derived from the distance matrix of FIG. 9.

The distance matrix is used to create the tree structure that is output by the program. FIG. 10 shows that portion of the tree that includes the items in our example.

As shown by this example, programs such as EZSort are now able to provide more appropriate relationship information, due to elimination of the distortion produced when a user does not understand an entry.

It is important to note that while the present invention has been described in the context of a method run on a computer, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

For example, the specific algorithm used here to measure a logical "distance" between items is based on an answer having a scale of 0 to 1. However, any reasonable scale could used, as long as it arrives at relative distances apart and a different algorithm could be used if it made allowances for removing items not sorted.

What is claimed is:

1. A method operative in a data processing system, the method comprising
performing the following steps for each participant of a plurality of participants:
displaying a plurality of item cards,
accepting participant input regarding logical groupings into which item cards of said plurality of item cards are sorted,
identifying item cards of said plurality of item cards that are not sorted by the participant into said logical groupings, and
saving a record of said logical groupings and a record of said item cards of said plurality of item cards that are not sorted into said logical groupings; and
calculating, for all of said plurality of participants by means of cluster analysis, an indication of perceived distance between ones of said item cards,
wherein said calculating step adjusts calculations using said item cards of said plurality of item cards that are not sorted into said logical groupings.

2. The method of claim 1, further comprising, as a step performed for each participant of said plurality of participants, asking said participant to verify that said participant is not familiar with content of item cards of said plurality of item cards that are not sorted into said logical groupings.

3. The method of claim 1, further comprising, as a step performed for each participant of said plurality of participants, accepting input regarding higher-level groupings for said item cards of said plurality of item cards that are sorted into said logical groupings.

4. The method of claim 3, further comprising, as a step performed for each participant of said plurality of participants, accepting names for higher-level groupings for said item cards of said plurality of item cards that are sorted into said logical groupings.

5. The method of claim 1, wherein, in said saving step, a raw score matrix is created for each participant with a value for each possible pair of items, said value being:
0 if said participant did not group said pair of items together at any level,
1 if said participant grouped said pair of items together at a first level but not at a second level, and
2 if said participant grouped said pair of items together at both said first level and said second level.

6. The method of claim 5, wherein in said calculating step, a total raw score (TRS) matrix is created by summing corresponding values of said raw score matrix for each participant.

7. The method of claim 1, wherein in said saving step, an unknown matrix is created for each participant with a value for each possible pair of items, said value being 0 if both of said pair of items are sorted into one of said logical groupings and 1 if one or both of said pair of items are not sorted.

8. The method of claim 7, wherein in said calculating step, a total unknown (TU) matrix is created by summing corresponding values of said unknown matrix for each participant.

9. The method of claim 1, wherein in said calculating step, normalized values for each pair of item cards are calculated by dividing a raw score for a pair of item cards by a value equal to a total number of participants responding less the number of participants who did not group one of said pair of item cards.

10. The method of claim 9, further comprising, in said calculating step, subtracting said normalized values from 1 to find a corresponding distance value.

11. A computer program product in a computer-readable medium comprising:
input instructions to be performed by each participant of a plurality of participants:
first instructions for presenting a plurality of item cards to be sorted into logical groupings;
second instructions for accepting participant input that sorts item cards of said plurality of item cards into logical groupings;
third instructions for identifying item cards of said plurality of item cards that are not sorted by said participant into said logical groupings; and
fourth instructions for saving information regarding said logical groupings and information regarding said item cards of said plurality of item cards that are not sorted into said logical groupings; and
calculating instructions for calculating relative distances between ones of said item cards, wherein said information regarding said item cards of said plurality of item cards that are not sorted are used in said calculating instructions
wherein said plurality of instructions are computer executable code.

12. The computer program product of claim 11, further comprising, as part of said input instructions:
fifth instructions for asking said participant to verify that said participant is not familiar with content of item cards of said plurality of item cards that are not sorted into said logical groupings.

13. The computer program product of claim 11, further comprising, as part of said input instructions, fifth instructions for accepting input regarding higher-level groupings for said item cards of said plurality of item cards that are sorted into said logical groupings.

14. The computer program product of claim 13, farther comprising, as part of said input instructions, sixth instructions for accepting names for higher-level groupings for said item cards of said plurality of item cards that are sorted into said logical groupings.

15. The computer program product of claim 11, wherein said fourth instructions create a raw score matrix for each participant with a value for each possible pair of items, said value being:
0 if said individual participant did not group said two items together at any level,
1 if said individual participant grouped said two items together at a first level but not at a second level, and
2 if said individual participant grouped said two items together at both said first level and said second level.

16. The computer program product of claim 15, wherein said calculating instructions calculate a total raw score matrix by summing corresponding values of said raw score matrix for each participant.

17. The computer program product of claim 11, wherein said fourth instructions create an unknown matrix for each participant with a value for each possible pair of items, said value being 0 if both of said pair of items are sorted into one of said logical groupings and 1 if one or both of said pair of items are not sorted.

18. The computer program product of claim 17, wherein said calculating instructions calculate a total unknown matrix by summing corresponding values of said unknown matrix for each participant.

19. The computer program product of claim 11, wherein said calculating instructions calculate normalized values for each pair of item cards by dividing a raw score for a pair of item cards by a value equal to a total number of individual participants responding less the number of participants who did not group one of said pair of item cards.

20. The computer program product of claim 11, wherein said calculating instructions comprise subtracting a normalized value from 1 to obtain a distance value.

21. A method operative in a data processing system, the method comprising:
   performing the following steps for each participant of a plurality of participants:
   displaying a plurality of item cards,
   accepting participant input regarding logical groupings into which item cards of said plurality of item cards are sorted,
   identifying item cards of said plurality of item cards that are not sorted by the participant; and
   asking said participant of said plurality of participants to verify that said participant is not familiar with content of item cards of said plurality of item cards that are not sorted, and
   calculating a raw score value for each pair of items according to a value of:
   0 if said participant did not group said pair of items together at any level,
   1 if said participant grouped said pair of items together at a first level but not at a second level, and
   2 if said participant grouped said pair of items together at both said first level and said second level,
   calculating an unknown value for each pair of items according to the value of:
   0 if both of said pair of items are sorted into one of said logical groupings, and
   1 if one or both of said pair of items are not sorted after said performing step, calculating, for each pair of items i and j, the following:
   a total raw score $R(i,j)$, determined by summing corresponding values from said raw score value for each of said participants,
   a total unknown score $U(i,j)$, determined by summing corresponding values from said unknown value for each participant,
   a similarity calculation according to the formula $S(i,j)=R(i,j)/(n-U(i,j))$, where n is the number of participants, and
   a distance calculation according to the formula $D(i,j)=1-S(i,j)$.

22. A computer system comprising:
   receiving means for receiving input;
   output means for delivering output;
   a processor, connected to said receiving means and to said output means, to process information;
   storage, connected to said processor, in which to store information; and
   instructions, stored in said storage for execution by said processor, said instructions comprising:
   input instructions to be performed by each participant of a plurality of participants;
   first instructions for presenting a plurality of item cards to be sorted into logical groupings;
   second instructions for accepting participant input that sorts item cards of said plurality of item cards into said logical groupings;
   third instructions for identifying item cards of said plurality of item cards that are not sorted by the participant into said logical groupings;
   fourth instructions for saving information regarding said logical groupings and item cards of said plurality of item cards that are not sorted into said logical groupings; and
   calculating instructions for calculating relative distances between ones of said item cards,
   wherein said plurality of instructions are computer executable code, and
   wherein said information regarding said item cards of said plurality of item cards that are not sorted are used in said calculating instructions.

23. The computer system of claim 22, further comprising, as part of said input instructions, asking said participant to verify that said participant is not familiar with content of said item cards of said plurality of item cards that are not sorted.

24. The computer system of claim 22, further comprising, as part of said input instructions, fifth instructions for accepting input regarding higher-level groupings for said item cards of said plurality of item cards that are sorted.

25. The computer system of claim 24, further comprising, as part of said input instructions, sixth instructions for accepting names for higher-level groupings for said item cards of said plurality of item cards that are sorted.

26. The computer system of claim 22, wherein said fourth instructions create a raw score matrix for each participant with a value for each possible pair of items, said value being:
   0 if said individual participant did not group said two items together at any level,
   1 if said individual participant grouped said two items together at a first level but not at a second level, and
   2 if said individual participant grouped said two items together at both said first level and said second level.

27. The computer system of claim 26, wherein said calculating instructions calculate a total raw score matrix by summing corresponding values of said raw score matrix for each participant.

28. The computer system of claim 22, wherein said fourth instructions create an unknown matrix for each participant with a value for each possible pair of items, said value being 0 if both of said pair of items are sorted into one of said logical groupings and 1 if one or both of said pair of items are not sorted.

29. The computer system of claim 28, wherein said calculating instructions calculate a total unknown matrix by summing corresponding values of said unknown matrix for each participant.

30. The computer system of claim 22, wherein said calculating instructions calculate normalized values for each pair of item cards by dividing a raw score for a pair of item cards by a value equal to a total number of individual participants responding less the number of participants who did not group one of said pair of item cards.

31. The computer system of claim 22, wherein said calculating instructions comprise subtracting a normalized value from 1 to obtain a distance value.

* * * * *